Figure 1:

Nov. 25, 1947.  A. H. HEYROTH  2,431,326
SILICON CARBIDE ARTICLES AND METHOD OF MAKING SAME
Filed Oct. 29, 1942

LEGEND
☐ SILICON OR SILICON RICH MATERIAL

▨ SILICON CARBIDE.

■ VOIDS.

INVENTOR.
ALBERT H. HEYROTH
BY
ATTORNEY

Patented Nov. 25, 1947

2,431,326

UNITED STATES PATENT OFFICE 2,431,326

SILICON CARBIDE ARTICLES AND METHOD OF MAKING SAME

Albert H. Heyroth, Niagara Falls, N. Y., assignor to The Carborundum Company, Niagara Falls, N. Y., a corporation of Delaware Application October 29, 1942, Serial No. 463,832

31 Claims. (Cl. 106—44)

The present application is a continuation-in-part of my copending application Serial No. 311,843, filed Dec. 30, 1939, which is in turn a continuation-in-part of my application Serial No. 180,807, filed Dec. 20, 1937.

This invention relates to silicon carbide articles, particularly those used as electrical resistances and electrical heating elements, and to a method of making the same.

Silicon carbide has long been known to possess properties desirable in electrical resistances and electrical heating elements. It has a very high resistivity in comparison with most materials, and it is a very stable material and capable of withstanding high temperatures without decomposition. It has one tendency, however, namely its tendency to oxidize at high temperatures, that has left something to be desired in electrical resistances and heating elements formed from or containing it.

On the whole, silicon carbide itself has been found to be a very desirable material for electrical resistances and electrical heating elements. The greatest difficulties in using it satisfactorily have come about through the fact that by the very nature of the articles used as resistances and heating elements, it has been necessary to form the crystalline or granular silicon carbide into articles of the desired shapes.

Heretofore there have been, generally speaking, two methods employed for forming silicon carbide crystals or granules into articles of the desired shape. One of these has included the use of a binding material such as clays, sodium silicate or the like. Electrical resistances and electrical heating elements made by bonding the silicon carbide crystals or granules by means of such materials as clays, sodium silicate or the like have not been found satisfactory, generally speaking, for a number of reasons, the principal ones being the high resistivity, lack of uniformity and changeableness during operation of the articles so made.

Another method that has been utilized in forming silicon carbide resistors has involved the recrystallization of the silicon carbide material. No extraneous bonding material is used in the recrystallization process but, on the other hand, the bonding of the crystals or grains to form a unitary structure is obtained by causing the silicon carbide material to become knit together through the vaporization and recrystallization of the silicon carbide.

Resistors made by the recrystallization process are open and porous and consequently oxidize badly at high temperatures. The cost of making resistors by the recrystallization method, moreover, has been found to be unduly high even though the resistors so made have properties greatly desired over those made by bonding the crystals or grains with extraneous material.

All of the methods employed commercially heretofore in the manufacture of silicon carbide resistors have required the use of previously formed silicon carbide, that is, silicon carbide is first made in the usual manner and then is crushed to the desired size. This, of course, adds to the cost of producing the articles.

The present invention has for its objects the avoidance of the above-enumerated and other disadvantages and the economical production of silicon carbide resistors of superior quality.

According to the present invention, the silicon carbide is formed in situ by subjecting a carbon body, in which at least a substantial part of the carbon forms a continuous skeletal structure, to the action of elemental silicon at a temperature well above the melting point of silicon. The silicon carbide not only is formed in situ, but it is formed very quickly because of the avidity of the skeletal carbon structure for vaporized elemental silicon at an elevated temperature.

The body containing carbon in a continuous skeletal formation can be made in several ways. It can be made by converting wood into charcoal, or by charring a body containing molasses, casein, dextrin, cereal flour, such as wheat flour, rye flour or buckwheat flour, or other carbonizable materials. It can be made entirely of the skeletal form of carbon, but if desired it may include also additional finely divided carbon that does not form a part of such skeletal carbon structure.

The body containing carbon in a continuous skeletal formation can also be made by reacting certain kinds of carbonaceous liquid with a proper reagent whereby the carbonaceous liquid releases carbon in such a manner that it entirely fills the container with a porous skeletal form of carbon. Not all carbonaceous liquids are suitable for this purpose; in most of them the carbon when released is precipitated as a sludge which sinks to the bottom of the residue liquid. A carbonaceous liquid admirably suited for the purpose of making bodies of the desired form of carbon is furfural or some of its derivatives such as, for example, furfuryl alcohol. Mixtures of furfural and furfuryl alcohol may also be employed. Many of the mineral acids will release the carbon from the furfural compounds, among them being hydrochloric and sulphuric acids.

When hydrochloric acid or sulfuric acid is mixed with furfural, the liberation of carbon commences at once but proceeds slowly to completion in a period ranging from 10 minutes or less to many hours, depending upon the ratio of the acid content to the furfural. This feature conveniently allows adequate time for mixing, stirring, and pouring before the congealing action has progressed beyond the "ink" stage.

When furfuryl alcohol or a mixture of furfural and furfuryl alcohol is employed and mixed with acid, the reaction proceeds in the same manner but at a faster rate. With furfuryl alcohol alone it is very rapid. When a mixture of furfural and furfuryl alcohol is used, the reaction is still faster than when furfural alone is employed, the speed of reaction in this case depending on the ratio of furfuryl alcohol to furfural. In this comparison of speed of reaction it is, of course, assumed that the ratio of the furfural compound or compounds to acid in the mixture is held constant.

The instant furfural compound and the acid are stirred together, an "ink" is formed by simultaneous release of atomic carbon in every portion of the mix. Subsequent action proceeds somewhat more slowly and operates to increase the size of and to knit together the "ink" aggregates produced during the primary reaction. During this stage of the reaction the carbon appears to "grow," much as a tremendously accelerated vegetable growth might be expected to proceed. In this manner a self-supporting carbon structure occupying the total volume of the liquid is built up, so that when the action is complete the resultant product may be likened to a wet sponge of the desired shape in which the sponge is analogous to the carbon body and the wetness to the residue of hydrochloric acid and/or the furfural compound.

The wet carbon shape is dried at a temperature high enough to drive off all moisture and other volatile matter. The shrinkage during this step is uniform in all directions and relatively small, varying slightly for different mix ratios. By the reaction above described between furfural compounds and acids, bodies consisting of 100% carbon may be produced having any desired structure varying from one imperviously dense to one having such porosity that only 5% of the total volume is carbon and 95% is air. In general, density increases with an increase in the proportion of the furfural compound in the mix. To be suitable for siliconization by the method hereinafter described, the carbon body so produced must be relatively porous. Therefore in making carbon bodies for siliconization not more than 60% furfural compound to 40% HCl or $H_2SO_4$ of the concentrations given in Examples VIII and IX, respectively, is ordinarily employed.

Microscopic examinations of carbon bodies produced by the reaction of furfural compounds with an acid reveals that the carbon in them is present in a continuous skeletal form. Such carbon has a systematic cellular structure and appears very much like that made by converting wood into charcoal or like the carbonized molasses, casein, dextrin, and cereal flours in the bodies of Examples I–VI, inclusive, after such bodies are carbonized. Such carbon, that is, that resulting from the reaction of furfural compounds and an acid, reacts in the same manner as those made by converting wood into charcoal or by charring a body containing a substantial amount of carbonizable material when it is subjected to the action of elemental silicon at a point well above the melting point of the silicon.

Carbon bodies made by the reaction of furfural compounds and an acid may include various other materials which modify the properties of either the carbon body or of the siliconized body resulting from siliconizing such body in the manner set out below. These materials are added to the mixture of the furfural compound and the acid employed. In the case of added solid materials, such as finely divided carbon, the particles are sufficiently small in size to remain suspended in substantially uniform distribution throughout the mixture until the carbon from the furfural develops sufficiently to hold them in place. Modifying liquids, such as glycerine, may be added to the mixture to add toughness to the resulting carbon shape so that it can be handled with ordinary care without danger of breakage.

The range of materials suitable for carrying out the present invention is very large and therefore it is not possible to give specific examples of all the possible combinations of materials that can be used. A few examples are here given for illustrative purposes. Examples I to VI, inclusive, illustrate the forming of the carbon body primarily from initially solid materials.

*Example I*

A mix suitable for ramming or tamping to shape.

Dry mix:                                      Per cent by weight
    Sawdust _____ 20
    Grain flour, e. g. wheat flour_____ 10
    Finely divided carbon, e. g. lamp black___ 70

The above materals are thoroughly mixed dry and then combined with molasses and water in the following proportions:

Per cent by weight
The above dry mix_____ 65–70
Molasses _____ 25
Water _____ 10–5

*Example II*

A mix suitable for extruding.

Per cent by weight
Grain flour, e. g. wheat flour_____ 13
Carbon, e. g. lamp black_____ 62
Water _____ 25

This mixture forms a dough suitable for extruding and, if desired, a small quantity of glycerin may be added in order to provide a lubricant for the extrusion.

*Example III*

A mixture suitable for rolling into sheets.

Per cent by weight
Grain flour, e. g. wheat flour_____ 27
Carbon, e. g. lamp black_____ 45
Casein glue containing approximately 15%
    casein _____ 28

Example IV

A mix suitable for tamping.

| | Per cent by weight |
|---|---|
| Carbon, e. g. lamp black | 29 |
| Charcoal, e. g. 20 mesh | 29 |
| Grain flour, e. g. wheat flour | 11 |
| Casein glue containing approximately 15% casein | 31 |

Example V

An extra flexible mix for extruding and forming into curved pieces.

| | Per cent by weight |
|---|---|
| Graphite, e. g. flake graphite | 28 |
| Grain flour, e. g. wheat flour | 22 |
| Charcoal, e. g. through 50 or 70 mesh | 10 |
| Casein glue containing approximately 15% casein | 40 |

Example VI

A mix suitable for extruding straight pieces.

| | Per cent by weight |
|---|---|
| Carbon, e. g. lamp black | 26 |
| Charcoal, e. g. 30–40 mesh | 26 |
| Grain flour, e. g. wheat flour | 17 |
| Casein glue containing approximately 15% casein | 31 |

Other materials that may be incorporated in the mixes in Examples I to VI, inclusive, either as partial or entire substitutes for the above materials, are wood flour, linseed oil, or animal glue as carbonizable materials and pulverized charcoal or pulverized coke as finely divided carbon.

The mixture containing the carbonizable material such as cereal flour, casein or glue is formed into a body of the desired shape and then dried. When dry, it is ready for carbonization and siliconization, which steps may be carried out separately or simultaneously.

The body may be carbonized as a separate step by being placed in an oven and heated to such temperature that the carbonizable material becomes completely charred and all volatile materials are driven off. As above indicated, the body need not, however, be carbonized as a separate step. The heating of the body during the reaction of the body and the metallic silicon in the methods of siliconizing the body set out below will accomplish the results of charring the carbonizable material and driving off the volatile matter in the body. It is therefore to be understood that the methods of siliconizing set out below are equally applicable whether or not the body containing carbonizable material has been preliminarily carbonized.

Examples VII, VIII, and IX give typical procedures in the formation of a carbon body by the reaction of a furfural compound and an acid; the examples are illustrative only and numerous variations are possible.

Example VII

A carbon body suitable for siliconizing is made by stirring together:

| | Cc. |
|---|---|
| Furfural | 40 |
| Commercial hydrochloric acid | 60 |

Such mixture is then poured into a mold having a cavity of the shape of the desired carbon body. Reaction between the furfural and the hydrochloric acid to form the carbon structure filling the mold is completed after several hours. The wet carbon body is then removed from the mold and is ready for calcining, but may be stored for any length of time prior to calcining. The calcining step consists of heating the body in a neutral atmosphere at a temperature high enough to drive off all moisture and other volatile matter. A temperature of 1200° F. has been found sufficient to accomplish such result. The carbon body is now ready for siliconizing.

Example VIII

Loadings of materials such as finely ground carbon or glycerine may be included in the mixture of the furfural compound and an acid for the purpose of obtaining modified characteristics therein. A typical mix of this character consists of:

| | | |
|---|---|---|
| Furfural | cc | 30 |
| Hydrochloric acid | cc | 70 |
| Finely ground carbon | grams | 35 |
| Glycerine | do | 30 |

To insure uniform distribution of the loading material in the mixture and, finally, the carbon body formed therefrom, the loading material, carbon and glycerine in this case, is first thoroughly mixed with either the furfural or the acid. The furfural and the acid are then stirred together and poured into a mold. The remainder of the procedure is the same as that in Example VII.

The furfural employed in Examples VII, VIII, and IX, is the ordinary commercial furfural. The concentration of the hydrochloric acid is not critical. In Examples VII and VIII, however, the hydrochloric acid used was ordinary commercial concentrated hydrochloric acid containing about 35% HCl. Glycerine renders the carbon body less delicate and less apt to be broken upon normal handling.

As has been stated above, instead of furfural, furfuryl alcohol may be used in this and similar reactions. In general, for slow setting mixes, furfural alone is used. When furfuryl alcohol alone is used, the reaction is very rapid and hard to control and the acid must be used in the dilute concentrations. For rapid setting mixes, a mixture of furfural and 4% furfuryl alcohol has been found to work very well. However, any desired proportion of furfuryl alcohol may be used with furfural to obtain the desired result.

Example IX

Sulphuric acid may be employed to release carbon from furfural, furfuryl alcohol or mixtures thereof. A typical example of the use of sulphuric acid in such reaction employs a mixture of:

| | Cc. |
|---|---|
| Furfural | 25 |
| Dilute sulphuric acid | 75 |

A loading of 20 grams of finely divided carbon.

The sulphuric acid employed consists of 60% water and 40% commercial concentrated sulphuric acid by volume. The mix is poured into a mold and the setting, drying, and siliconizing procedure outlined in Examples VII and VIII is followed thereafter.

As with hydrochloric acid, when reacted with sulphuric acid, furfural alone gives a slow setting mix. For rapid setting mixes, furfuryl alcohol or mixtures of furfural and furfuryl alcohol are employed.

The step of calcining the dried carbon body while commercially desirable, is not absolutely necessary since the heating upon siliconization will drive off the volatile matter from the body. It has been found best, however, to calcine the carbon body before siliconizing it, since otherwise the body is apt to be cracked by the rapid escape of the volatile matter upon siliconization.

One way of carrying out the carbonization and siliconization of the body comprises providing a mass of molten silicon slightly greater in amount than that required to completely siliconize the body and, while further heating the said silicon mass, carefully laying the body on the surface of molten silicon. Silicon that is just molten will not penetrate the body to any material extent, but as soon as the further heating of the silicon causes it to reach a critical temperature, the impregnation of the article by the silicon is almost instantaneous. Not only does the silicon rapidly penetrate and impregnate the whole body but it also reacts with the carbon to form silicon carbide.

The impregnation and reaction takes place so rapidly when the proper temperature is reached that it is difficult to explain just what happens, but it is believed that the reaction which takes place occurs between the skeletal carbon structure and silicon in the vapor phase. The part of the carbon body which is in contact with the liquid silicon naturally receives the greatest amount of elemental silicon vapor. Such vapor first impinges upon and reacts with the skeletal carbon structure at that point to form silicon carbide. The reaction, being exothermic, causes the carbon and silicon adjoining the zone of reaction to become heated to a high temperature and thus causes progressive impingement on unreacted parts of the body by the silicon vapor and thus progressive impregnation of the body by the silicon. One reason why it is believed that in the reaction between the skeletal carbon structure and metallic silicon above described it is silicon in the vapor state which reacts with the carbon is that a body of carbon in the skeletal form may be submerged for long periods below the surface of a mass of molten silicon with no appreciable reaction occurring between them. At most there is a shallow surface impregnation of the pores of the carbon body with metallic silicon; there is little if any conversion of the skeletal carbon structure to silicon carbide.

Whether the above explanation of the reaction between the skeletal carbon and silicon as carried out by the method of this invention is correct or not is not known, but it is known that the portion of the carbon body in contact with the liquid silicon first becomes heated to a higher temperature than either the molten silicon or the remainder of the carbon body, and that the zone of higher temperature moves upwardly of the carbon body as the impregnation proceeds.

Another mode of carrying out the siliconizing step of the present invention comprises forming a body of the desired shape from a mixture of the character given in the above examples and laying the body on a mass of granular elemental silicon at ordinary room temperature. Having placed the article in contact with crushed elemental silicon, the temperature of the article and the silicon is raised rapidly to the point where rapid impregnation of the article by the silicon takes place. The exact temperature at which such action takes place is difficult to fix definitely but the probable temperature can be given as being above 1800° C. and perhaps as high as 2500° C. or even 3000° C.

The heating of the carbon and the silicon by the above method from room temperature to the critical temperature, well above the melting point of silicon, at which rapid impregnation of the carbon by the silicon takes place, may theoretically be conducted at any desired rate. Practically, because the porous form of carbon to be siliconized is easily reactive and because the process in this example is carried out in the atmosphere, the heating must be conducted at a rapid rate to prevent the carbon body from burning up.

The time for such impregnation is only a matter of seconds, and the entire heating time need not exceed from thirty seconds to one minute. The time varies according to the character of electrical equipment used and the rate of application of current. In general a heating period of from three to five minutes is sufficient under any conditions that are suitable for carrying out the siliconization process.

When the proper temperature has been reached, the penetration of the article by the silicon is extremely rapid and as the amount of silicon in contact with the article is only slightly in excess of that required to completely fill the pores of the article, the time elapsing between the beginning of the impregnation and its completion will be a matter of seconds.

In carrying out the process of the present invention by the above methods it is desirable that the temperature of the article be maintained at the impregnation point or even slightly higher for a short time after the excess silicon has been volatilized, in order that the surface of the article may be smooth and free from surface-adhering silicon or silicon-containing material.

Another method by which the carbon body having at least a substantial amount of the carbon in the form of a continuous skeletal structure may be siliconized is to subject it to contact solely with silicon vapor. This may be done, among other ways, by placing metallic silicon and a body of the above mentioned carbon having at least a substantial amount of the carbon in the skeletal structure in a container of graphite which is then substantially sealed from the atmosphere. The silicon is contained in a shallow graphite pan or in a recess in the floor of the graphite container, and the carbon body is placed in proximity to, but in such relationship with, the silicon that silicon in the molten state cannot contact it. Usually the carbon body is placed on the floor of the graphite container.

The silicon is then heated to a point well above its melting point. One convenient method is to place the graphite container, for example, a tube, between the electrodes of an electric resistance furnace. When a tube is employed, the ends of the tube may be placed in contact with the furnace electrodes, which thus substantially seal the tube. After heating the container for a length of time, which is approximately the same as the length of heating the silicon and carbon in the example given above in which the carbon body and the silicon are heated together from room temperature, and to at least the same temperature as that in the aforementioned example given above, that is, well above the melting point of the silicon, the container is cooled and the body, which was initially carbon, removed.

It is found that the resulting body is of the same composition as those produced by the procedures in previous examples in which the carbon body is in contact with the mass of molten silicon. It is obvious that in this method of siliconizing the carbon body the reaction occurs between the skeletal carbon and silicon in the vapor phase, with the silicon vapor impinging on the carbon body. The graphite container seals the reaction sufficiently from the air so that most of the silicon in the vapor state does not become oxidized to $SiO_2$. In this method, because a closed container is used, it is necessary to use a carbon body made by reaction of a furfural compound an acid, or, if such body is made similarly to those in Examples I–VI, inclusive, to carbonize it before placing it in the container.

In the case of bodies made from materials primarily solid initially and which employ a carbonizable binder, as in Examples I–VI, inclusive, the carbonizable binder is converted to carbon during the separate carbonizing step, if such is employed, or during the early part of the siliconizing process if it is chosen to carbonize and siliconize the body simultaneously. The carbonaceous residue so formed by conversion of the carbonizable binder to carbon forms or binds the finely divided carbon into a continuous cellular or skeletal structure that is substantially free from other than carbonaceous materials. The material carbonized in situ causes complete penetration of the article containing lamp black by the silicon and appears to be responsible for the reticular or network structure of the finished article.

In the case of carbon bodies formed from carbon resulting from reaction of furfural compounds and an acid, as well as in the case of wood charcoal, the carbon is in a continuous but porous cellular or skeletal formation. Solid loading material, added to the mixture of furfural compound and acid, occurs uniformly distributed in the resulting carbon body. Such loading is employed in quantities insufficient to change substantially the character of the carbon resulting from the reaction. In any event, at least a substantial portion of such body consists of carbon in a porous cellular or skeletal formation. Such continuous porous cellular carbon, upon siliconization of the body of charcoal or of the body resulting from the reaction of furfural compounds and an acid, with or without loading, causes complete penetration of the body by the silicon, and appears to be responsible for the same recticular or network structure of the finished article that is observable in cases where bodies are made in accordance with Examples I–VI, inclusive.

Part of the silicon, which penetrates to and fills the innermost pores of the article when the correct temperature is reached, combines with the finely divided cellular carbon to form silicon carbide of a particular variety.

When silicon carbide that is formed by this process is examined by X-ray diffraction methods, it shows a pattern characteristic of a cubic material, in contra-distinction to the pattern of the usual kind of silicon carbide, which is hexagonal or trigonal. The structure of the silicon carbide formation, moreover, is reticular, that is, the silicon carbide forms a substantially continuous network or skeletal structure throughout the article.

A small proportion of the silicon carbide formed by the process appears, under the microscope, to have crystallized from a molten magma, for example from a silicon-rich magma.

The article of this invention, in addition to its silicon carbide, contains silicon-rich material in the interstices of the silicon carbide network or skeleton and may contain uncombined carbon. A chemical analysis of the material of this invention shows that it contains more than 20% of silicon in addition to that combined with the carbon in the form of silicon carbide.

The silicon-rich material in the interstices of the article apparently is a solid solution of either silicon carbide and silicon or carbon and silicon or a solid solution of all three of these materials, because it has been found that this silicon-rich material has a much higher melting point than that of elemental silicon.

Figure 2:
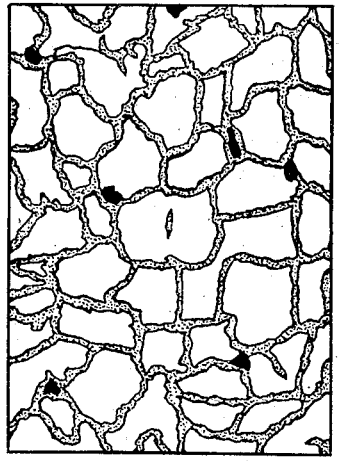

The structure of articles produced in accordance with this invention is illustrated in the appended drawings in which Figure 1 represents a greatly magnified view of a polished section of an article made from a mix of the type represented by Example II above and Figure 2 represents a greatly magnified view of a polished section of an article made from a mix of the type represented by Example III above.

Siliconized articles resulting from siliconizing bodies made by the reaction of furfural compounds and an acid have much the same appearance, when sectioned and polished, as those made from mixes such as those in Examples I to VI, inclusive. The cellular skeletal carbon is changed to silicon carbide, and the interstices between the silicon carbide are filled with metallic silicon or silicon rich material.

The material of the present invention has a very low resistivity as compared with silicon carbide resistors of the processes heretofore known. For example, an article made from the mix of Example V above has a specific resistance of approximately .003 ohm/cm. cube. This low specific resistance, coupled with the fact that the mix from which the article is made can be of a consistency well adapted to the extruding process, makes it possible to form the unsiliconized material into articles of sizes and shapes not heretofore possible. For example, it can be extruded as a rod or filament having a diameter of one-sixteenth ($\frac{1}{16}$) inch and such a rod or filament can be formed into a spiral, the turns of which are of small radius, for example of one-eighth ($\frac{1}{8}$) inch radius.

When bodies made from the furfural compound-acid reaction are employed as the carbon body to be siliconized, intricate shapes are easily produced. A temporary mold made from such material as wax may be employed and may be removed from the formed carbon body after completion of the reaction by the use of heat. Since the reacting ingredients and their mixture are initially liquid, they flow into all portions of the mold, thus faithfully yielding the desired shape of carbon body.

The present invention is useful not only in the production of silicon carbide resistors per se but also in the production of what are known as "cold ends" in silicon carbide resistors made by other methods than that disclosed herein.

It has been the practice heretofore to make the terminal ends of silicon carbide resistors of lower resistivity than the main body portion in order that such terminal ends would operate at lower temperatures, hence the name "cold ends."

The mix typified by Example III above can be made into a pasty consistency and applied to the end of a silicon carbide resistor, whereupon, upon being siliconized by the method described herein it becomes converted into a body of siliconized silicon carbide as illustrated in Figure II of the attached drawing.

An outstanding advantage of the material of the present invention resides in the fact that it is substantially non-porous and hence is decidedly resistant to oxidation. Being resistant to oxidation it does not change in resistance over long periods of service at high temperatures.

Another advantage is that its temperature coefficient of electrical resistance is such that it is stable as a heating element; that is, it reaches a maximum temperature for a given applied voltage and does not require external means for keeping the current value from becoming greater and greater.

Whereas the material of the present invention has been described in connection with electrical applications, it is to be understood that I do not restrict myself to such use. Because it is strong, refractory, and resistant to oxidation, it gives excellent service in cases where it is made into mechanical elements which are subjected to high temperatures for long periods of time.

Having thus described my invention, I claim:

1. A new article of manufacture comprising a continuous body of crystalline silicon carbide in which the silicon carbide is substantially continuous throughout although skeletal and reticular and has an X-ray pattern characteristic of a cubic material, and a substantial amount of silicon uncombined with carbon in the interstices of the body between the silicon carbide.

2. A new article of manufacture comprising a continuous crystalline, siliconized body of silicon carbide in which the silicon carbide is substantially continuous throughout although skeletal and reticular and has an X-ray pattern characteristic of a cubic material and in which there is more than 20% silicon uncombined with carbon.

3. A new article of manufacture comprising a continuous crystalline, siliconized body of silicon carbide and uncombined carbon in which the silicon carbide is substantially continuous throughout although skeletal and reticular and has an X-ray pattern characteristic of a cubic material and in which there is more than 20% silicon uncombined with carbon.

4. A new article of manufacture comprising a continuous body of crystalline silicon carbide in which the silicon carbide is substantially continuous throughout although skeletal and reticular and has an X-ray pattern characteristic of a cubic material, and in the neighborhood of 20% of silicon uncombined with carbon in the interstices between the silicon carbide.

5. The method of making siliconized silicon carbide articles in which the silicon carbide is substantially continuous although reticular and has an X-ray pattern characteristic of a cubic material and in which there is a substantial amount of uncombined silicon in the interstices of the body between the silicon carbide, comprising forming a porous body of the desired shape and composed predominantly of carbon, at least a substantial amount of said carbon being in the form of a continuous skeletal structure, placing the said porous body which is composed predominantly of carbon in proximity to a mass of silicon, the porous body and the silicon being so placed that silicon vapor from the silicon upon heating impinges on the porous body, raising the temperature of the silicon to a point above its melting point whereby rapid impregnation of the silicon vapor into the pores of the body takes place, the total time from the initial contact of the porous body with the silicon in the vapor state to the end of the rapid impregnation of the body being in the order of a few minutes or less.

6. The method of making siliconized silicon carbide articles in which the silicon carbide is substantially continuous although reticular and has an X-ray pattern characteristic of a cubic material, and in which there is a substantial amount of uncombined silicon in the interstices of the body between the silicon carbide, comprising forming a porous body of the desired shape and composed predominantly of carbon, at least a substantial amount of said carbon being in the form of a continuous skeletal structure, contacting the said porous body which is composed predominantly of carbon with a mass of molten silicon, and raising the temperature of the silicon to a point above its melting point whereby rapid impregnation of the silicon into the pores of the body takes place, the total time from initial contact of the body with the molten silicon to the end of the rapid impregnation of the body being in the order of a few minutes or less.

7. The method of making siliconized silicon carbide articles in which the silicon carbide is substantially continuous although reticular and in which there is a substantial amount of uncombined silicon in the interstices of the body between the silicon carbide, comprising contacting a body composed predominantly of carbon in which at least a substantial amount of carbon forms a continuous skeletal structure with a mass of molten silicon, and raising the temperature of the silicon to a point above its melting point whereby rapid impregnation of the silicon into the pores of the body takes place, the total time from initial contact of the body with the molten silicon to the end of the rapid impregnation of the body being in the order of a few minutes or less.

8. The method of making siliconized silicon carbide articles in which the silicon carbide is substantially continuous although reticular and in which there is a substantial amount of silicon in the interstices of the body between the silicon carbide, comprising forming a body of the desired shape, said body being composed predominantly of carbonaceous material and containing at least a substantial amount of carbonizable material, carbonizing the body whereby the carbonizable material forms a continuous skeletal structure, contacting the carbonized body with a mass of molten silicon and raising the temperature of the silicon to a point above its melting point whereby rapid impregnation of the silicon into the pores of the body takes place, the total time from initial contact of the body with the molten silicon to the end of rapid impregnation of the body being in the order of a few minutes or less.

9. The method of making siliconized silicon carbide articles comprising forming an article of the desired shape from a mixture containing finely divided carbon and a substantial amount of carbonizable material, carbonizing the article whereby the carbonizable material forms a continuous skeletal structure, contacting the said article with a mass of molten silicon and raising the temperature of the silicon to a point above its melting point in a relatively short time, whereby rapid impregnation of the silicon into the pores of the article takes place.

10. The method of making siliconized silicon carbide articles comprising forming an article of the desired shape from a mixture containing finely divided carbon and a substantial amount of carbonizable material, carbonizing the article whereby the carbonizable material forms a continuous skeletal structure, contacting the said article with a mass of molten silicon slightly in excess of the amount required to fill the pores of the article, raising the temperature of the silicon to a point above its melting point in a relatively short time, whereby rapid impregnation of the silicon into the pores of the article takes place and maintaining the temperature of the silicon until said excess has been volatilized.

11. The method of making a siliconized silicon carbide article comprising forming a carbonizable body of the desired shape, said body containing at least a substantial amount of carbonizable material, carbonizing the body whereby the carbonizable material forms a continuous skeletal structure and contacting the said body with a mass of molten silicon, raising the temperature of the silicon to a point above 1800° C. in a relatively short time whereby rapid impregnation of the silicon into the pores of the body takes place.

12. The method of making siliconized silicon carbide articles comprising forming an article of the desired shape from a mixture of finely divided carbon and a substantial amount of carbonizable material, carbonizing the article whereby the carbonizable material forms a continuous skeletal structure, contacting said article with a mass of molten silicon at temperatures substantially below the temperature of rapid penetration of the article by the silicon and raising the temperature of the silicon to a point above 1800° C. in a relatively short time, whereby rapid impregnation of the silicon into the pores of the article takes place.

13. The method of making silicon carbide articles in which the silicon carbide is substantially continuous although reticular and in which there is a substantial amount of uncombined silicon in the interstices of the body between the silicon carbide, comprising forming a porous body of the desired shape and composed predominantly of carbon, at least a substantial amount of said carbon being in the form of a continuous skeletal structure, contacting the said porous body which is composed predominantly of carbon with a mass of molten silicon in such manner that most of the body is above the silicon, raising the temperature of the silicon to a point above its melting point whereby rapid impregnation of the silicon upwardly into the pores of the body takes place, the total time from the initial contact of the body with the molten silicon to the end of the rapid impregnation of the body being in the order of a few minutes or less.

14. The method of making silicon carbide articles in which the silicon carbide is substantially continuous although reticular and in which there is a substantial amount of uncombined silicon in the interstices of the body between the silicon carbide, comprising forming an article of the desired shape from a mixture containing finely divided carbon and a substantial amount of carbonizable material, carbonizing the body whereby the carbonizable material forms a continuous skeletal structure, contacting the carbonized body with a mass of molten silicon in such manner that most of the body is above the silicon, and raising the temperature of the silicon to a point above its melting point whereby rapid impregnation of the silicon upwardly into the pores of the body takes place, the total time from the initial contact of the body with the molten silicon to the end of the rapid impregnation of the body being in the order of a few minutes or less.

15. The method of making siliconized silicon carbide articles in which the silicon carbide is substantially continuous although reticular and has an X-ray pattern characteristic of a cubic material and in which there is a substantial amount of uncombined silicon in the interstices of the body between the silicon carbide, comprising forming a porous body of a desired shape and composed predominantly of carbon, at least a substantial amount of said carbon being in the form of a continuous skeletal structure, placing the said porous body which is composed predominantly of carbon in a container, placing a mass of metallic silicon in said container in proximity to the porous body but in such relationship to the porous body that the latter is not contacted by the silicon when in either solid or molten state, substantially sealing the container from the atmosphere, raising the temperature of the silicon to a point above its melting point whereby rapid impregnation of silicon vapor into the pores of the body takes place, the total time from initial contact of the body with the silicon in the vapor state to the end of the rapid impregnation of the body being in the order of a few minutes or less.

16. The method of making silicon carbide articles in which the silicon carbide is substantially continuous although reticular and in which there is a substantial amount of uncombined silicon in the interstices of the body between the silicon carbide, comprising forming a porous body composed predominantly of carbon by the reaction of an acid, with one of the following group: furfural, furfuryl alcohol, and a mixture of furfural and furfuryl alcohol, at least a substantial amount of the carbon in the porous body being in the form of a continuous skeletal structure, contacting the porous body with a mass of molten silicon and raising the temperature of the silicon to a point above its melting point in a relatively short time whereby rapid impregnation of the silicon into the pores of the body takes place.

17. The method of making silicon carbide articles in which the silicon carbide is substantially continuous although reticular and in which there is a substantial amount of uncombined silicon in the interstices of the body between the silicon carbide, comprising forming a mixture comprising an acid and one of the following group: furfural, furfuryl alcohol, and a mixture of furfural and furfuryl alcohol, allowing the furfural compound and acid to react in a mold of the desired shape to form a porous body composed predominantly of carbon, at least a substantial amount of said carbon being in the form of a continuous skeletal structure, removing said porous body from the mold, drying it, contacting the said porous body with a mass of molten silicon and raising the temperature of the silicon to a point above its melting point in a relatively short time whereby rapid impregnation of the silicon into the pores of the body takes place.

18. The method of making silicon carbide articles in which the silicon carbide is substantially continuous although reticular and in which there is a substantial amount of uncombined silicon in the interstices of the body between the silicon carbide, comprising forming a mixture comprising finely divided carbon, an acid, and one of the following group: furfural, furfuryl alcohol, and a mixture of furfural and furfuryl alcohol, allowing the furfural compound and the acid to react in a mold of the desired shape to form a porous body composed predominantly of carbon, at least a substantial amount of the said carbon being in the form of a continuous skeletal structure, removing said porous body from the mold, drying said porous body contacting the said body with a mass of molten silicon and raising the temperature of the silicon to a point above its melting point in a relatively short time whereby rapid impregnation of the silicon into the pores of the body takes place.

19. The method as set out in claim 16 in which the acid employed to react with the furfural compound is hydrochloric acid.

20. The method set out in claim 16 in which the acid employed to react with the furfural compound is sulfuric acid.

21. The method of making silicon carbide articles in which the silicon carbide is substantially continuous although reticular and in which there is a substantial amount of uncombined silicon in the interstices of the body between the silicon carbide, comprising forming a mixture comprising glycerine, an acid, and one of the following group: furfural, furfuryl alcohol, and a mixture of furfural and furfuryl alcohol, allowing the furfural compound and acid in such mixture to react in a mold of the desired shape to form a porous body composed predominantly of carbon, at least a substantial amount of said carbon being in the form of a continuous skeletal structure, removing said porous body from the mold, drying said porous body, contacting the said porous body with a mass of molten silicon and raising the temperature of the silicon to a point above its melting point in a relatively short time whereby rapid impregnation of the silicon into the pores of the body takes place.

22. The method of making silicon carbide articles in which the silicon carbide is substantially continuous, and reticular with approximate uniformity throughout, with a silicon carbide content in crystalline form with an X-ray pattern characteristic of a cubic material, and with the interstices in said article substantially filled with silicon-rich material which comprises subjecting a continuous, skeletal, carbonaceous body to the action of elemental uncombined silicon at a temperature sufficiently above the melting point of pure silicon to vaporize some of said elemental silicon and start an exothermic reaction between them, and concomitantly during said treatment maintaining a surface zone of substantial area of said body free of liquid silicon until the reaction is substantially complete.

23. The method of making silicon carbide articles in which the silicon carbide is substantially continuous and recticular with approximate uniformity throughout, with the silicon carbide content in crystalline form with an X-ray pattern characteristic of a cubic material, and with the interstices in the skeletal silicon carbide body substantially filled with silicon-rich material which comprises subjecting a carbonaceous, rigid body to a temperature and atmospheric conditions sufficient to carbonize said structure into a skeletal, reticular body throughout, and said skeletal body to the action of elemental silicon at a temperature sufficiently above the melting point of pure silicon to vaporize some of said elemental silicon and start an exothermic reaction between them, and maintaining a surface zone of substantial surface area of said body free of liquid silicon until the reaction is substantially complete.

24. The method of making silicon carbide articles in which the silicon carbide is substantially continuous, and reticular with approximate uniformity throughout, with the silicon carbide content in crystalline form with an X-ray pattern characteristic of a cubic material, and with the interstices in the skeletal silicon carbide body substantially filled with silicon-rich material, which comprises subjecting a continuous, skeletal, carbonaceous body to the action of elemental silicon at a temperature sufficiently above the melting point of pure silicon to vaporize some of said elemental silicon and start an exothermic reaction, maintaining said temperature without substantial fall until the reaction is approximately complete, and concomitantly maintaining a surface zone of substantial area of said body free of liquid silicon until the reaction is substantially complete.

25. A new article of manufacture comprising a continuous, reticular, skeletal body of crystalline silicon carbide of approximately uniform regularity throughout, with the interstices in the silicon carbide skeletal structure substantially filled with silicon-rich material containing a substantial portion of elemental silicon, the silicon carbide content being in crystalline form with an X-ray pattern characteristic of a cubic material in contra-distinction to the hexagonal or trigonal pattern of the usual silicon carbide.

26. A new article of manufacture comprising a continuous, reticular, skeletal body of crystalline silicon carbide of approximately uniform regularity throughout, with the interstices in said body substantially filled with silicon-rich material, the silicon carbide content being in crystalline form with an X-ray pattern characteristic of a cubic material in contra-distinction to the hexagonal or trigonal pattern of the usual silicon carbide.

27. A new article of manufacture comprising a product having the properties and characteristics of the product produced in accordance with the method of claim 23.

28. A new article of manufacture comprising a product produced in accordance with the method of claim 24.

29. A new article of manufacture comprising a relatively thick body of crystalline silicon carbide which is substantially continuous although reticular throughout and which has an X-ray pattern characteristic of a cubic material, and a substantial amount of silicon uncombined with carbon in the interstices of the body between the silicon carbide.

30. The method of making silicon carbide articles in which the silicon carbide is substantially continuous, and reticular with approximate uniformity throughout, with the silicon carbide content in crystalline form and an X-ray pattern characteristic of a cubic material, and with the interstices in the silicon carbide body substantially filled with silicon-rich material, which comprises supporting a continuous carbonaceous body upon a layer of elemental silicon, with at least a substantial surface area of said body exposed to atmosphere, and heating said elemental silicon to a temperature which vaporizes it and through it heats said body, and continuing the application of heat to the silicon until an exothermic reaction has started and continued progressively across said body.

31. The method of making silicon carbide articles in which the silicon carbide is substantially continuous, and reticular with approximate uniformity throughout, with the silicon carbide content in crystalline form and an X-ray pattern characteristic of a cubic material, and with the interstices in the silicon carbide body substantially filled with silicon-rich material, which comprises supporting a continuous, carbonaceous body upon a layer of elemental silicon, in molten condition, with said body only partially submerged therein, at a temperature sufficiently above the melting point of elemental silicon to vaporize some of the elemental silicon and initiate an exothermic reaction between the body and the elemental silicon, and maintaining such temperature until the exothermic reaction has progressed substantially entirely across said body.

ALBERT H. HEYROTH.

REFERENCES CITED

The following references are of record in the file of this patent:

UNITED STATES PATENTS

| Number | Name | Date |
|---|---|---|
| 1,013,700 | Tone | Jan. 2, 1912 |
| 821,017 | Clark | May 22, 1906 |